US011971163B2

(12) United States Patent
Matsushima

(10) Patent No.: US 11,971,163 B2
(45) Date of Patent: Apr. 30, 2024

(54) LIGHT SOURCE DEVICE

(71) Applicant: Ushio Denki Kabushiki Kaisha, Tokyo (JP)

(72) Inventor: Takeo Matsushima, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/230,084

(22) Filed: Aug. 3, 2023

(65) Prior Publication Data

US 2024/0102631 A1 Mar. 28, 2024

(30) Foreign Application Priority Data

Sep. 27, 2022 (JP) ................................ 2022-153987

(51) Int. Cl.

*F21V 5/00* (2018.01)
*F21V 14/06* (2006.01)
*F21V 17/02* (2006.01)
*F21Y 105/18* (2016.01)
*F21Y 115/10* (2016.01)

(52) U.S. Cl.

CPC .............. *F21V 5/008* (2013.01); *F21V 14/06* (2013.01); *F21V 17/02* (2013.01); *F21Y 2105/18* (2016.08); *F21Y 2115/10* (2016.08)

(58) Field of Classification Search

CPC ........... F21V 5/008; F21V 14/06; F21V 17/02
See application file for complete search history.

(56) References Cited

U.S. PATENT DOCUMENTS

2006/0222042 A1* 10/2006 Teramura ........... G02B 27/0961 372/101
2008/0285158 A1* 11/2008 Okabe .................... G02B 21/02 359/739
2012/0050894 A1* 3/2012 Honma .................. G02B 7/023 29/428
2020/0183123 A1* 6/2020 Hagiwara ............ H02K 11/215
2021/0116668 A1* 4/2021 Nemoto ................. G02B 7/021
2022/0349541 A1* 11/2022 Gerlich ............... H01L 31/0488
2022/0397259 A1* 12/2022 Zhang ..................... F21V 5/007

FOREIGN PATENT DOCUMENTS

JP 2004-335953 A 11/2004

* cited by examiner

*Primary Examiner* — Christopher E Dunay
(74) *Attorney, Agent, or Firm* — Kenichiro Yoshida

(57) ABSTRACT

A light source device includes a plurality of LED elements dispersed and arranged in a plane direction orthogonal to an optical axis, a first optical system that converts light emitted from each of the LED elements into collimated light; and a second optical system that focuses the collimated light. The first optical system includes a first collimating optical system including optical components disposed corresponding to the LED elements and a second collimating optical system including optical components disposed corresponding to the LED elements at the latter stage of the first collimating optical system. The second collimating optical system is capable of adjusting a relative optical positional relation with respect to the LED elements and the first collimating optical system when viewed in a direction of the optical axis in a state in which the LED elements and the first collimating optical system are fixed.

18 Claims, 12 Drawing Sheets

LIGHT SOURCE DEVICE

CROSS-REFERENCE TO RELATED APPLICATION(S)

This application claims priority from Japanese Priority Patent Application No. 2022-153987 filed on Sep. 27, 2022. The entire teachings of the above application are incorporated herein by reference.

BACKGROUND ART

The present invention relates to light source devices, particularly a light source device using a plurality of LED elements.

Conventionally, light processing technologies utilizing light have been used in diverse fields. For example, exposure apparatuses are utilized for microfabrication using light. In recent years, exposure technology has been deployed in various fields, and among microfabrication, it is used to fabricate relatively large patterns and for three-dimensional microfabrication. More specifically, exposure technology is used, for example, to fabricate LED electrode patterns and for the manufacturing process of MEMS (Micro Electro Mechanical Systems), as represented by acceleration sensors.

In these light processing technologies, discharge lamps with high brightness have been used as light sources for a long time. However, with recent advances in solid-state light source technology, the use of a plurality of LED elements arranged as a light source is being considered. As such technology, for example, JP-A-2004-335953 discloses an exposure apparatus in which a unit consisting of a plurality of LED elements is used as a light source, and a fly-eye lens is disposed between this light source and a mask.

SUMMARY OF THE INVENTION

Compared to a light source device in which its light source is composed of a lamp, a light source composed of LED elements has a low radiant luminous flux. Hence, in order to configure a light source device that achieves high light output, it is necessary to collect the light emitted from a plurality of LED elements as much as possible. If there is a misalignment between the plurality of LED elements and the subsequent optical system, it becomes impossible to guide the light with sufficient light intensity to the optical system that is intended to use the light. Such misalignment unavoidably occurs, even if to a lesser or greater degree.

In view of the above-mentioned problems, the present invention aims to provide a light source device including a plurality of LED elements, and capable of suppressing a decrease in illuminance caused by misalignment.

A light source device according to the present invention includes:

- a plurality of LED elements that are dispersed and arranged in a plane direction orthogonal to an optical axis;
- a first optical system that converts light emitted from each of the plurality of LED elements into collimated light; and
- a second optical system that focuses the collimated light emitted from the first optical system at the latter stage of the first optical system. The first optical system includes a first collimating optical system including optical components disposed corresponding to the plurality of LED elements and a second collimating optical system including optical components disposed corresponding to the plurality of LED elements at the latter stage of the first collimating optical system. The second collimating optical system is capable of adjusting a relative optical positional relation with respect to the plurality of LED elements and the first collimating optical system when viewed in a direction of the optical axis in a state in which the plurality of LED elements and the first collimating optical system are fixed.

As mentioned above, the light emitted from an LED element has a lower brightness than that of a lamp. For this reason, it is important to collect light from a plurality of LED elements without reducing brightness as much as possible, when the light source is considered to be used for applications that need much light, such as exposure apparatuses, for example.

According to the above configuration, the light emitted from the plurality of LED elements is collimated in the first optical system and then focused. This enables the light emitted from each of the LED elements to be focused to form an image at the condensing position. In addition, adjusting the arrangement of the first optical system, which functions as a collimating optical system, makes it possible to narrow the spacing between the light fluxes emitted from the respective LED elements, thus configuring a light source with fewer non-light-emitting areas. As a result, a light source device with high brightness is achieved.

If misalignment occurs between the plurality of LED elements and the first optical system, it is assumed that the amount of light guided to the latter stage of the second optical system will be reduced. For example, if there occurs misalignment in the positional relation between each LED element and the corresponding collimating lens (first optical system) individually, the condensing position of the second optical system is misaligned, making it difficult to guide light efficiently to the latter stage of the second optical system. This reduces the amount of light guided to the latter stage of the second optical system, resulting in a decrease in illuminance to the exposure surface when the device is utilized as an exposure apparatus, for example.

In contrast, the light source device according to the present invention is configured to be capable of adjusting the relative optical positional relation between the plurality of LED elements and the first optical system when viewed in the direction of the optical axis. Hence, even if the light source device is mounted with misalignment between each LED element and the corresponding collimating lens (first optical system), adjusting the relative optical positional relation between them is capable of correcting the misalignment of the condensing position by the second optical system, resulting in efficiently guiding light to the latter stage of the second optical system.

Furthermore, the light source device according to the present invention includes the first optical system in which the first collimating optical system is located on the side near the plurality of LED elements and the second collimating optical system located at the latter stage of the first collimating optical system. The light source device is configured to be capable of adjusting the relative positional relation between the plurality of LED elements and the first collimating optical system, and the second collimating optical system. Employing such a configuration eliminates the need for allowing the LED elements and the first collimating optical system located in proximity to the LED elements to move relative to each other during the position adjustment, avoiding the risk of damaging the light-emitting surface and wiring of the LED elements during the adjustment.

Here, when the relative optical positional relation between the first collimating optical system and the second collimating optical system disposed at the latter stage of the first collimating optical system is adjusted, finer adjustment is possible at a greater distance from the light source in the traveling direction of light. In other words, if the adjustment is made using the first collimating optical system located near the light source, a small movement of the first collimating optical system will result in a large shift in the position of the image formed by the second collimating optical system. This makes the adjustment by the first collimating optical system difficult because the more delicate adjustment is necessary. Accordingly, in addition to avoiding the risk of damaging the light-emitting surface and wiring of the LED elements as described above, making the plurality of LED elements and the first collimating optical system in a fixed state provides a more favorable adjustment.

More specifically, the light source device may include a substrate on which the plurality of LED elements are mounted, a first lens holder that accommodates the first collimating optical system and is connected to the substrate in a fixed manner, and a second lens holder that accommodates the second collimating optical system and is capable of adjusting a relative position with respect to the first lens holder.

In the above configuration, the substrate on which the LED elements are mounted and the first lens holder are fixed. This enables the surface of the substrate on which the LED element is mounted to be used as a reference surface when the position of the respective lenses is adjusted.

In addition, disposing the lens holder (first lens holder) at a distance separate from the substrate on which the LED element is mounted in the direction of the optical axis, makes it possible to serve a protective function on the LED element. More specifically, in the case of the COB (Chip On Board) type where the light-emitting surface of the LED element is disposed in a bare state, the LED element can be positioned in the space partitioned by the first lens holder, thereby protecting the light-emitting surface and wiring of the LED element. Even when the light-emitting surface of the LED element is covered with resin or other materials, the LED element can be positioned in the space separated by the first lens holder, thereby preventing dust and condensation from adhering to the resin surface.

In this way, by employing a configuration in which the first lens holder covers the substrate on which the LED element is mounted, it is expected to have effects in protecting the LED element and preventing a decrease in light-emitting intensity due to the adhesion of foreign matter. On the other hand, when such a configuration is employed, moving the relative position of the first lens holder with respect to the substrate for the optical position adjustment poses a risk of damaging the light-emitting surface or wiring of the LED element or, in some cases, causing electrical leakage. However, the above configuration is capable of performing the optical position adjustment in a state in which the substrate on which the plurality of LED elements are mounted is integrally fixed with the first collimating optical system and adjusting the relative positional relation between the second collimating optical system, which is disposed at a distance separate from the plurality of LED elements, and the substrate and the first collimating optical system. This results in significantly reducing the risk of damaging the light-emitting surfaces and wiring of the LED elements during the position adjustment, even when the configuration in which the first lens holder is used to cover the substrate on which the LED elements are mounted is employed.

As an example, the light source device may include an adjustment mechanism attached to the first lens holder to allow the first lens holder and the substrate to integrally move in a plane direction orthogonal to the direction of the optical axis in a state in which the position of the second lens holder is fixed.

As another example, the light source device may include an adjustment mechanism attached to the second lens holder to allow the second lens holder to move in a plane direction orthogonal to the direction of the optical axis in a state in which the positions of the first lens holder and the substrate are fixed.

As a more specific example, the light source device may include a through-hole penetrating the second lens holder at a predetermined location of the second lens holder in a direction parallel to the optical axis, a groove having an inner diameter shorter than the inner diameter of the through-hole and being carved from the face of the first lens holder in the side of the second lens holder for a predetermined length in the direction parallel to the optical axis, and a fixing member including a shaft section having an outer diameter shorter than the inner diameter of the through-hole and being insertable into the groove, and a head having an outer diameter longer than the inner diameter of the through-hole and being connected to the shaft section. The adjustment mechanism may be configured to allow the first lens holder and the substrate to be movable by a distance within a margin defined by the difference between the inner diameter of the through-hole and the outer diameter of the shaft section of the fixing member in the plane direction orthogonal to the direction of the optical axis in a state in which the head of the fixing member is in non-contact with the face of the second lens holder.

As the fixing member, a screw can be used. In this case, the groove may have thread cutting. As the adjustment mechanism, a clamping screw, cam, or pin can be used.

The through-hole may be provided in the first lens holder. In other words, the light source device may include a through-hole penetrating the first lens holder at a predetermined location of the first lens holder in a direction parallel to the optical axis, a groove having an inner diameter shorter than the inner diameter of the through-hole and being carved from the face of the second lens holder in the side of the first lens holder for a predetermined length in the direction parallel to the optical axis, and a fixing member including a shaft section having an outer diameter shorter than the inner diameter of the through-hole and being insertable into the groove, and a head having an outer diameter longer than the inner diameter of the through-hole and being connected to the shaft section.

The adjustment mechanism may also be configured to allow the second lens holder to move. That is, the adjustment mechanism may be configured to allow the second lens holder to be movable by a distance within a margin defined by the difference between the inner diameter of the through-hole and the outer diameter of the shaft section of the fixing member in a plane direction orthogonal to the direction of the optical axis in a state in which the head of the fixing member is in non-contact with the face of the second lens holder.

The light source device may satisfy the following formula:

$$0.1\times D\times(\theta_2/\theta_1)\leq(\phi_h-\phi_p)/2\leq D\times(\theta_2/\theta_1)$$

where $\phi_h$ is the inner diameter of the through-hole, $\phi_p$ is the outer diameter of the shaft section of the fixing member, D is the maximum diameter of the light-emitting surface of the LED element, $\theta_1$ is the maximum light-acceptance angle of each optical component provided in the first collimating optical system, and $\theta_2$ is the maximum light-acceptance angle of each optical component provided in the second collimating optical system.

When the fixing member is located in the through-hole, the adjustable amount of the relative positional relation between the second collimating optical system, and the first collimating optical system and the plurality of LED elements (substrates) depends on a difference value ($\phi_h-\phi_p$) between the inner diameter of the through-hole and the outer diameter of the shaft section of the fixing member. When $\theta_1$ denotes the maximum light-acceptance angle of the optical component (typically a lens) provided in the first collimating optical system and $\theta_2$ denotes the maximum light-acceptance angle of the optical component (typically a lens) provided in the second collimating optical system, moving the second collimating lens by a distance d with respect to the light source is optically equivalent to moving the light source by $d\times(\theta_2/\theta_1)$.

By designing the inner diameter of the through-hole and the outer diameter of the shaft section such that $0.1\times D\times(\theta_2/\theta_1)\leq(\phi_h-\phi_p)/2$ is satisfied, this makes it possible to adjust the optical position of the LED element and the first optical system (collimating optical system) with respect to the plane direction orthogonal to the optical axis in a distance within 10% of the maximum diameter of the light-emitting surface of the LED element, ensuring a sufficient amount of adjustment in consideration of actual operation.

Of course, increasing the adjustable amount significantly enables the adjustment of the optical positional relation of the LED element and the first optical system (collimating optical system) with respect to the plane direction orthogonal to the optical axis. In reality, however, it cannot be assumed that the optical position adjustment can be performed for a distance greater than the maximum diameter of the light-emitting surface of the LED element, and conversely, making the adjustable amount too large results in making the inner diameter of the through-hole provided in the lens holder larger than necessary. By designing the inner diameter of the through-hole and the outer diameter of the shaft section such that $(\phi_h-\phi_p)/2\leq D\times(\theta_2/\theta_1)$ holds true, this makes it possible to limit the maximum adjustment amount of the optical positional relation between the LED element and the first optical system (collimating optical system) with respect to the plane direction orthogonal to the optical direction to the maximum diameter of the light-emitting surface of the LED element.

The light source device may include an integrator optical system the incident surface of which is located at the focal point of the second optical system.

The light emitted from an LED element has a smaller radiant luminous flux than that of a lamp. Hence, it is necessary to collect the light emitted from a plurality of LED elements as much as possible for the use of a light source device for exposure, for example. Accordingly, it is necessary to increase the number of LED elements arranged as a light source.

Incidentally, LED elements themselves cannot be arranged completely closely together because wiring patterns for power supply are essential for the LED elements. In other words, when a plurality of LED elements are arranged, a certain spacing is inevitable between the adjacent LED elements. This area constituting the spacing constitutes an area where no light is emitted (non-light-emitting area). Accordingly, even when a plurality of LED elements are simply arranged to focus the light emitted from each LED element, the non-light-emitting area inevitably occurs. Hence, it is possible that simply focusing the light emitted from a plurality of LED elements results in an uneven illuminance on the irradiated surface.

In contrast, the above configuration suppresses the occurrence of uneven illuminance on the irradiated surface because the integrator optical system is located at the focal point of the second optical system. The integrator optical system may be constituted by a light guiding member, such as a rod integrator, that guides light incident from the incident surface to the emission surface while repeatedly reflecting the light on the inner side faces thereof, or a fly-eye lens with a plurality of lenses arranged in a matrix.

Effects of the Invention

The present invention, even when misalignment occurs between the optical system and LED elements in a light source device including a plurality of LED elements, suppresses a decrease in brightness and illuminance due to the misalignment.

DETAILED DESCRIPTION OF THE EMBODIMENTS

The following is a description of an embodiment of the light source device according to the present invention with reference to the drawings. Note that the dimensional ratios in the respective figures do not necessarily match the actual dimensional ratios.

Figure 1:
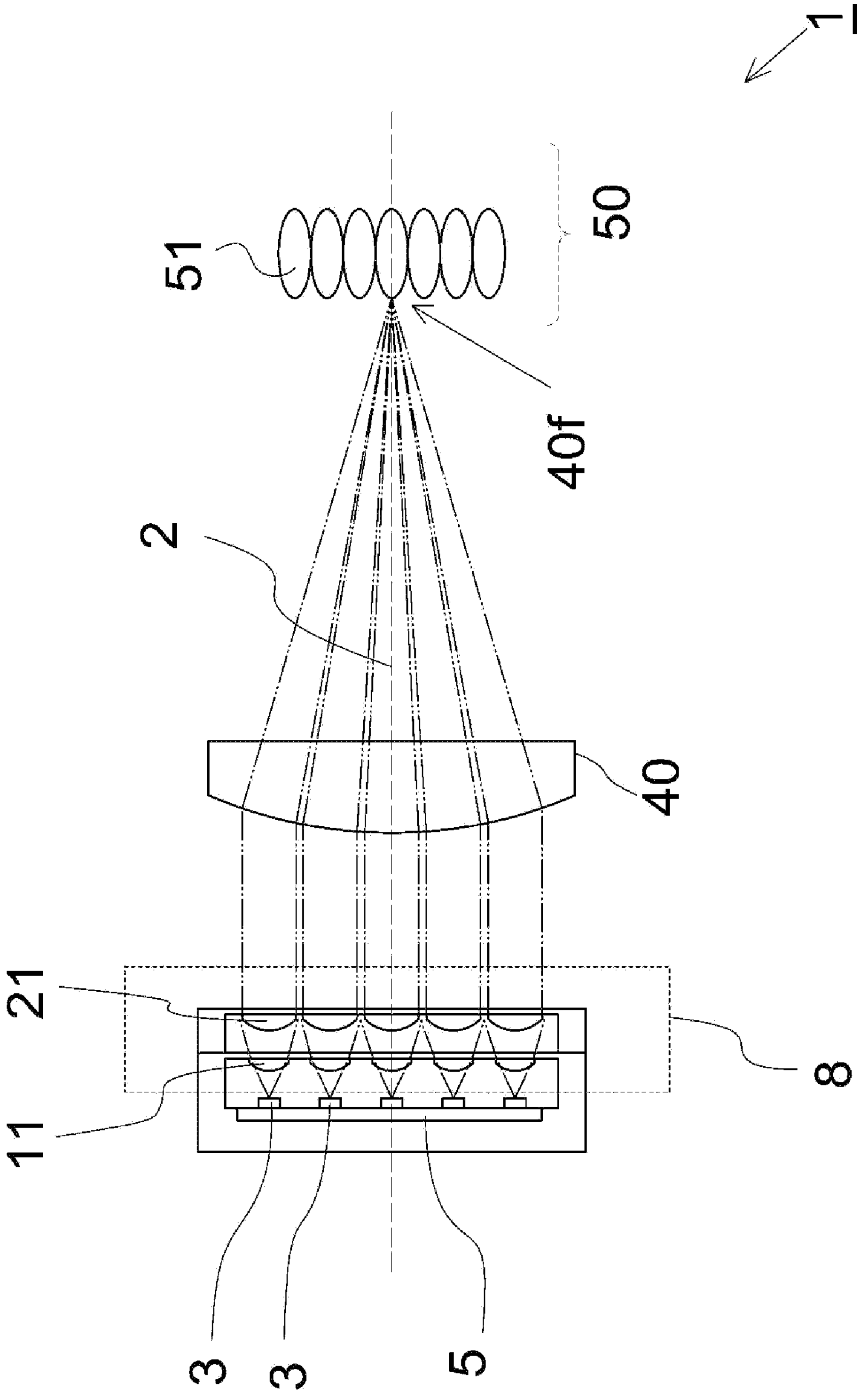
FIG. 1 is a drawing schematically illustrating a configuration of one embodiment of a light source device.

FIG. 1 is a drawing schematically illustrating a configuration of one embodiment of a light source device. A light source device 1 shown in FIG. 1 includes a plurality of LED elements 3, a first optical system 8, a second optical system 40, and an integrator optical system 50.

The plurality of LED elements 3 are mounted on a substrate 5 and dispersed and arranged in a plane direction orthogonal to an optical axis 2.

The first optical system 8 is an optical system that collimates light emitted from the plurality of LED elements 3 and includes a plurality of optical components arranged corresponding to the respective LED elements. In the present embodiment, the first optical system 8 includes a first collimating optical system 11 disposed in the side near the plurality of LED elements 3, and a second collimating optical system 21 disposed at the latter stage of the first collimating optical system 11. The first collimating optical system 11 and the second collimating optical system 21 may include a plurality of optical components arranged corresponding to the respective LED elements. The optical components here are typically lenses.

The light emitted from the plurality of LED elements 3 is guided to the second optical system 40 as collimated light after passing through the first collimating optical system 11 and the second collimating optical system 21. The second optical system 40 is an optical system that focuses this collimated light to a focal point 40*f* of the second optical system 40.

In the present embodiment, the integrator optical system 50 is disposed such that the incident surface of the integrator optical system 50 is located at the focal point 40*f* of the second optical system 40. FIG. 1 illustrates an example in which the integrator optical system 50 is constituted by a fly-eye lens 51. This allows light with high brightness to be focused on the incident surface of the fly-eye lens 51, emitting light with high brightness from the fly-eye lens 51.

The light source device 1 of the present embodiment is capable of adjusting the relative position of the second collimating optical system 21 with respect to the plurality of LED elements 3 and the first collimating optical system 11 while maintaining the relative position between the plurality of LED elements 3 and the first collimating optical system 11. This point will be described with reference to FIG. 2 and the following drawings.

Figure 2:
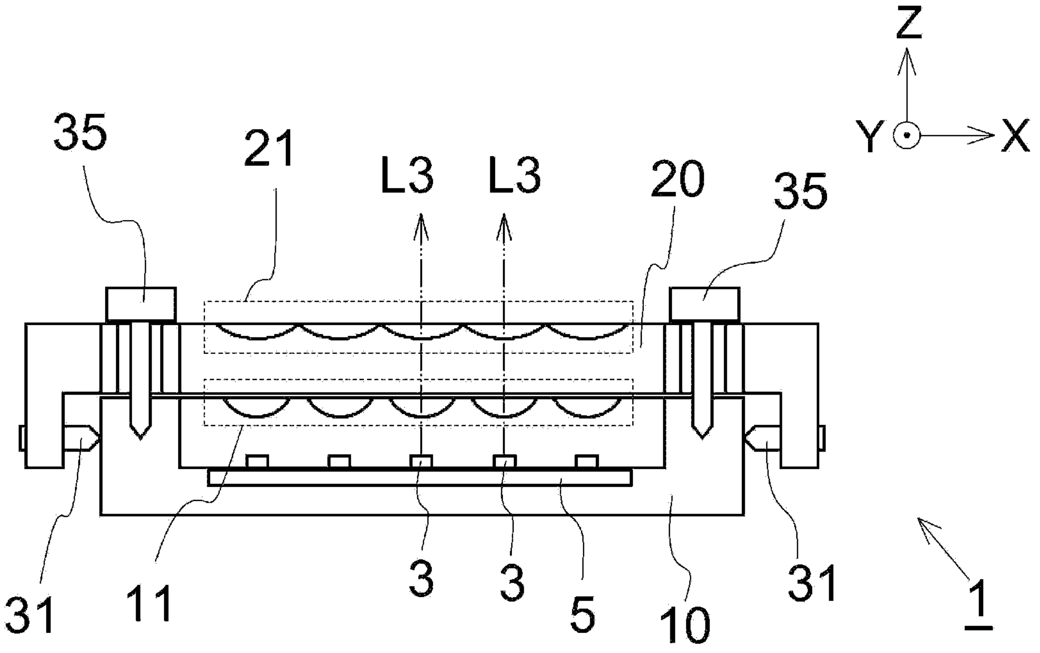
FIG. 2 is a cross-sectional view illustrating an example of the arrangement of a plurality of LED elements, a first collimating optical system, and a second collimating optical system.

FIG. 2 is a cross-sectional view illustrating an example of the arrangement of the plurality of LED elements 3, the first collimating optical system 11, and the second collimating optical system 21. The light source device 1 includes a first lens holder 10 that accommodates the first collimating optical system 11 and a second lens holder 20 that accommodates the second collimating optical system 21. The first lens holder 10 is integrated into the substrate 5 on which the LED elements 3 are mounted.

In the following description, as shown in FIG. 2, introduced is the X-Y-Z coordinate system in which the direction of the principal ray of light L3 emitted from the plurality of LED elements 3 is the Z direction, and the plane orthogonal to the Z direction is the X-Y plane. Referring to this coordinate system, the plurality of LED elements 3 mounted on the substrate 5 are dispersed and arranged on the X-Y plane. Then, the plurality of LED devices 3 are covered with the first lens holder 10 around the outer periphery in the +Z direction and the direction along the XY plane. For more detail, the first collimating optical system 11 accommodated in the first lens holder 10 is disposed at a position separate from the plurality of LED elements 3 with respect to the +Z direction. Furthermore, the second collimating optical system 21 is disposed at a position in the +Z side from the first collimating optical system 11.

In the present embodiment, the light source device 1 includes an adjustment mechanism 31 and a fixing member 35. The adjustment mechanism 31 is a member that adjusts the relative position of the first collimating optical system 11 and the second collimating optical system 21. In the example shown in FIG. 2, when the adjustment mechanism 31 is operated, the first lens holder 10 moves in a predetermined direction on the X-Y plane with respect to the second lens holder 20 as a reference. The fixing member 35 is a member that restricts the movement of the first lens holder 10 and the second lens holder 20 in the Z direction and also that fixes the first lens holder 10 and the second lens holder 20 after their positional relation has been adjusted in the X-Y plane.

Figure 3:
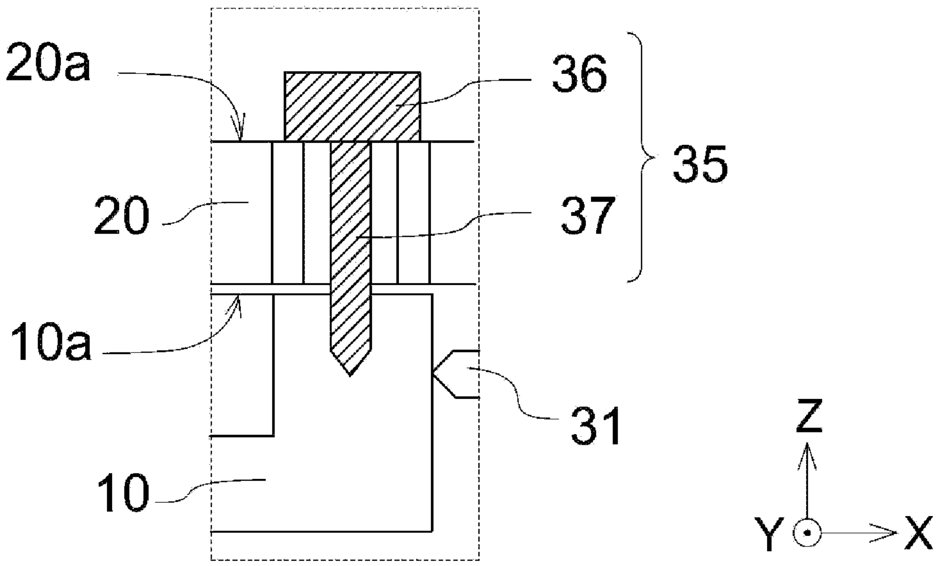
FIG. 3 is a partially enlarged view of FIG. 2.

FIG. 3 is a partially enlarged view of FIG. 2, illustrating the state in which the positions of the first lens holder 10 and the second lens holder 20 are fixed by the fixing member 35. The fixing member 35 is a member including a head 36 and a shaft section 37 having a shorter outer diameter than the head 36 and extending in a predetermined direction. Typically the fixing member 35 is a screw member. In the example shown in FIG. 3, the head 36 of the fixing member 35 is in contact with a face 20*a* of the second lens holder 20 that is located on a side away from the first lens holder 10. The shaft section 37 of the fixing member 35 penetrates the second lens holder 20 in the Z direction, and its front end reaches one part in the first lens holder 10.

Figure 4:
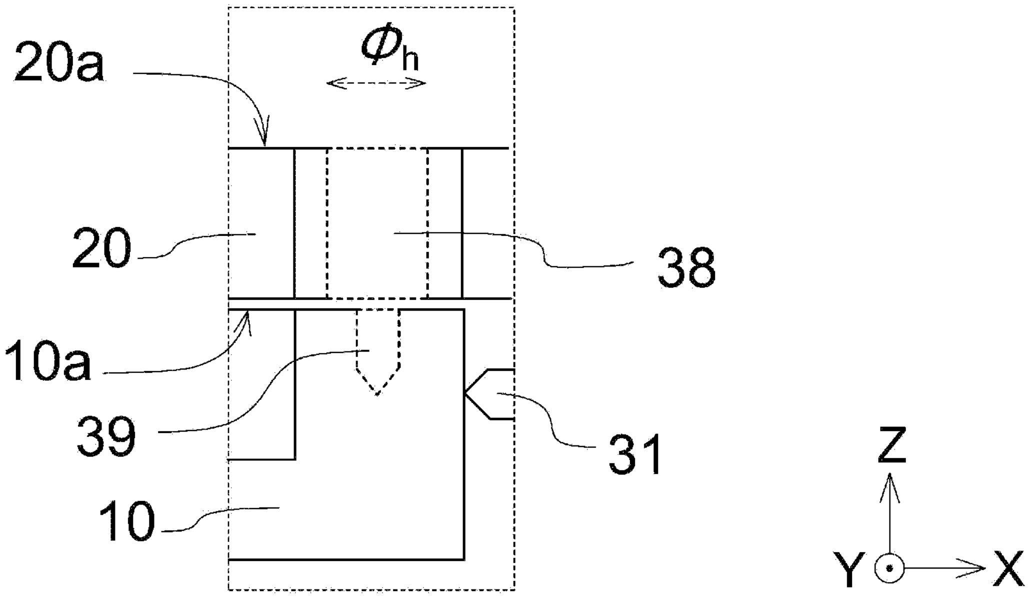
FIG. 4 is a schematic view in which a fixing member is removed from the state shown in FIG. 3.

FIG. 4 is a schematic view in which the fixing member is removed from the figure shown in FIG. 3. In the example shown in FIG. 4, the second lens holder 20 has a through-hole 38 formed to penetrate the second lens holder 20 in the Z direction at a predetermined location. The first lens holder 10 has a groove 39 carved from a face 10*a* of the second lens holder 20 for a predetermined length in the Z direction. The inner diameter of the groove 39 is shorter than the inner diameter $\phi_h$ of the through-hole 38. As shown in FIGS. 3 and 4, the groove 39 is a space into which the front end of the shaft section 37 of the fixing member 35 is inserted, and the through-hole 38 is a space into which the center portion of the shaft section 37 of the fixing member 35 is inserted.

Figure 5:
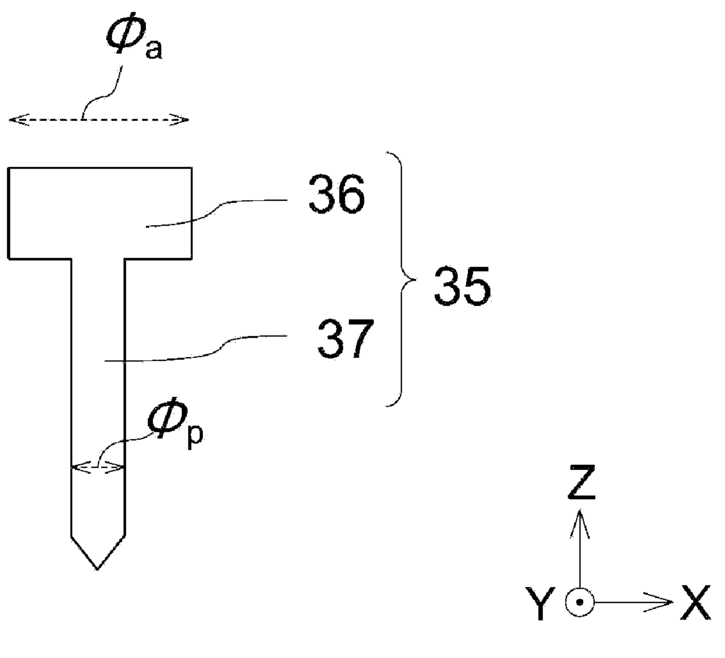
FIG. 5 is a cross-sectional view schematically illustrating the structure of the fixing member.

FIG. 5 is a cross-sectional view schematically illustrating the structure of the fixing member 35. The outer diameter $\phi_p$ of the shaft section 37 is nearly equal to the inner diameter of the groove 39 and shorter than the inner diameter $\phi_h$ of the through-hole 38 shown in FIG. 4. In addition, the outer diameter $\phi_a$ of the head 36 is longer than the inner diameter $\phi_h$ of the through-hole 38. In this configuration, when the fixing member 35 is inserted across the through-hole 38 and the groove 39, the head 36 brings into contact with the face 20*a* of the second lens holder 20, and the front end of the shaft section 37 reaches near the bottom face of the groove 39, as shown in FIG. 3. Performing the thread cutting in the inner wall of the groove 39 and the front end of the shaft section 37 enables the fixing member 35 to screw the first lens holder 10 and the second lens holder 20 together.

Figure 6:
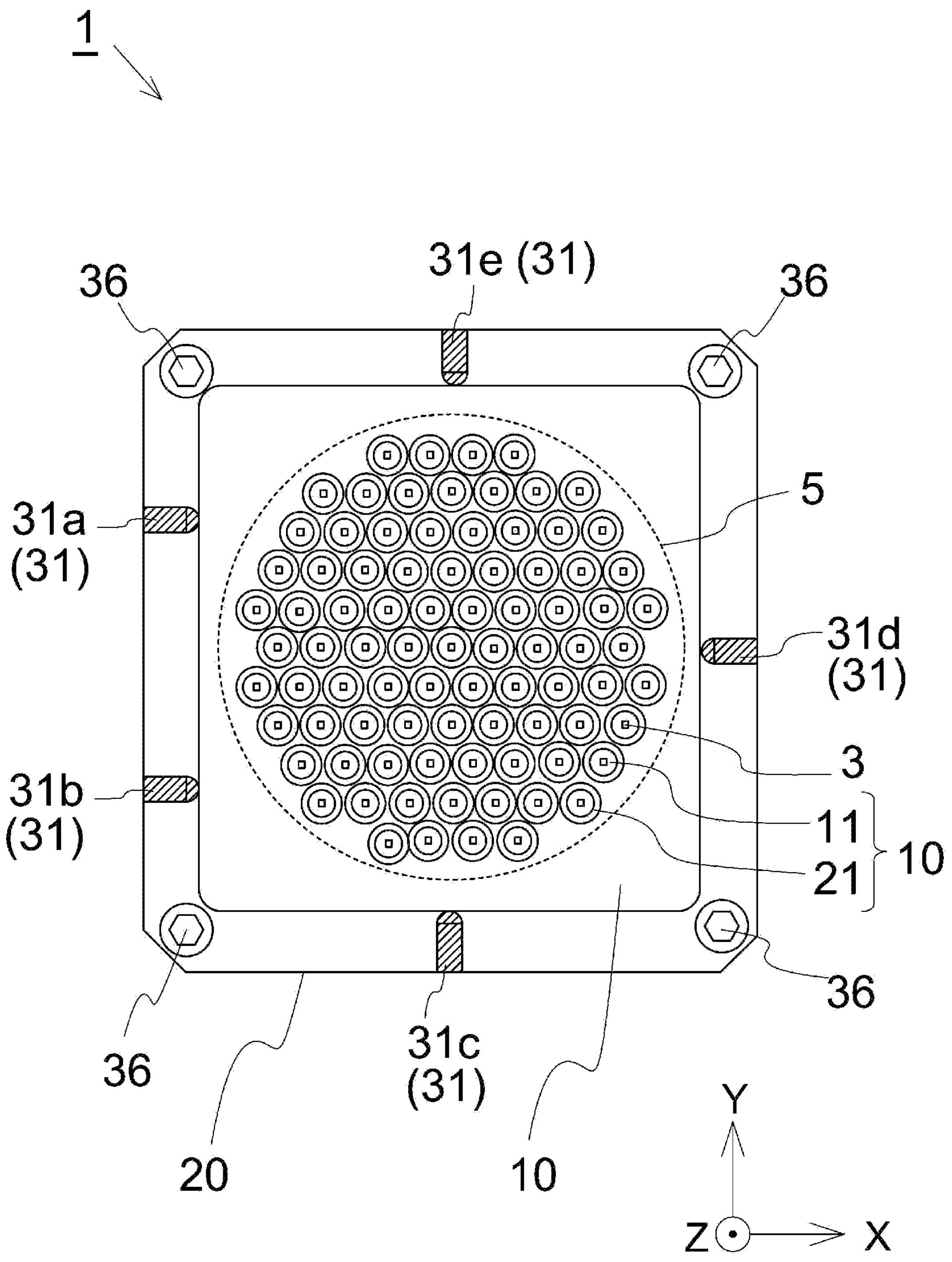
FIG. 6 is a plan view schematically illustrating the plurality of LED elements and a first optical system, viewed in a direction opposite to the traveling direction of light.
Figure 7:
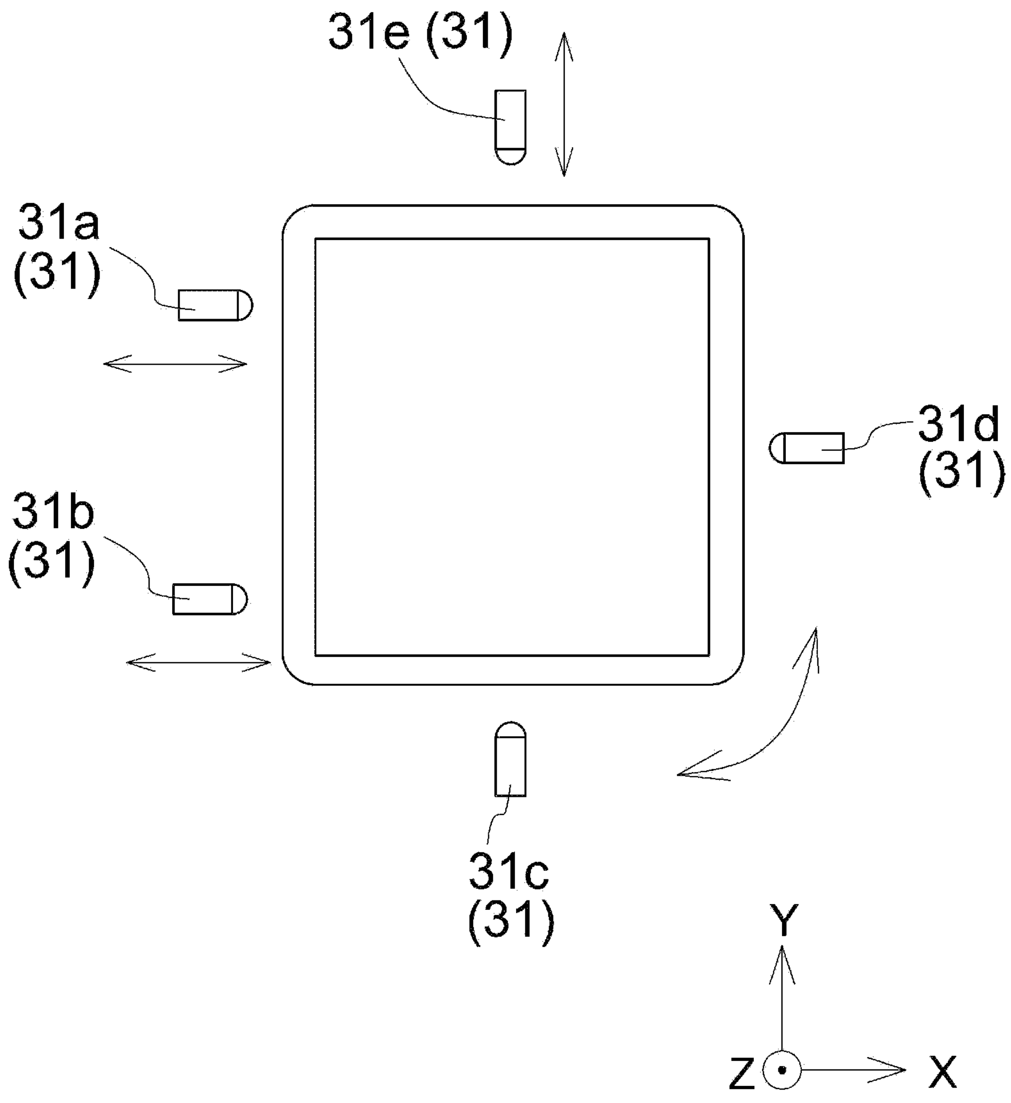
FIG. 7 is a drawing illustrating FIG. 6 further schematically.

Next, the adjustment mechanism 31 will be described with reference to FIG. 6. FIG. 6 is a plan view schematically illustrating the plurality of LED elements 3 and the first optical system 8, viewed in a direction opposite to the traveling direction of the light L3. In FIG. 6, an example of the light source device 1 including the fixing members 35 provided at four locations and the adjustment mechanisms 31 provided at five locations is illustrated. However, in FIG. 6, only the heads 36 of the fixing members 35 are shown for convenience of illustration. In the following, the adjustment mechanisms 31 provided at five locations are referred to as adjustment mechanisms 31*a*, 31*b*, . . . , and 31*e*, for convenience of explanation. FIG. 7 is a drawing illustrating FIG. 6 further schematically. Here, as an example, described is the case where the adjustment mechanisms 31*a*, 31*b*, and 31*c* are clamping screws and the adjustment mechanisms 31*d* and 31*e* are ball plungers. As the adjustment mechanism 31, known mechanisms such as clamping screws, ball plungers, pins, cams, and other parts can be employed.

The adjustment mechanisms 31*d* and 31*e*, which are constituted by ball plungers, include built-in springs. In the state where the movement restriction of the shaft section 37 of the fixing member 35 in the groove 39 is released, more specifically, in the state where the fastened screw is loosened, pushing and pulling the adjustment mechanisms 31*a*, 31*b*, and 31*c*, which are constituted by clamping screws provided at three locations, allows the rigid balls located at the front ends of the adjustment mechanisms 31*d* and 31*e* to move. This movement adjusts the relative positional relation of the first lens holder 10 and the second lens holder 20 in the X-Y plane. Specifically, as shown by both arrows in FIG. 7, the movement in the X direction, the movement in the Y direction, and the rotational movement in the 0 direction can be performed.

As mentioned above, the substrate 5 on which the plurality of LED elements 3 are mounted is fixed to the first lens holder 10. Hence, the adjustment of the relative positional adjustment between the first lens holder 10 and the second lens holder 20 on the X-Y plane means the adjustment of the relative positional adjustment between the plurality of LED elements 3 and the second lens holder 20 on the X-Y plane. In other words, this means the adjustment of the optical positional relation of the plurality of LED elements 3 and the first optical system 8 in the X-Y plane.

In practice, the image was measured while the adjustment mechanism 31 was operated to adjust the relative positional relation between the first lens holder 10 and the second lens holder 20 in the state of lighting the plurality of LED elements 3. In this verification, a rod integrator was employed as the integrator optical system 50 (see FIG. 12 described below), and the image at the incident surface of the rod integrator was measured. As the light source, 85 pieces of the LED elements 3 were arranged in an area of 80 mm×80 mm.

FIGS. 8A to 8D are each a drawing schematically illustrating the picture of the image at each time point. In each figure, a reference area is indicated by a sign 61, the area appearing as the image is indicated by a sign 60, and the location of the center of an image 60 is indicated by a sign 62.

As an example, the adjustment mechanisms 31*a*, 31*b*, and 31*c*, which are constituted by clamping screws, can be moved across 0.4 mm in the front-rear direction by making one turn and can be moved across 0.1 mm by making one-quarter turn. In addition, as shown in FIG. 7, varying the amount of movement of the two adjustment mechanisms 31*a* and 31*b* provided along the same side (here, the side along the Y direction) makes it possible to move the first lens holder 10, to which the plurality of LED elements 3 are fixed with respect to the second lens holder 20, in the θ direction.

As an example, when the spacing between the above two adjustment mechanisms 31*a* and 31*b* is 60 mm, the rotation of the LED elements 3 arranged in the area of 80 mm×80 mm by 1° can be achieved by shifting the relative positional relation of the above two adjustment mechanisms 31*a* and 31*b* by approximately 1 mm (two and a half turns). In this case, only one of the above two adjustment mechanisms 31*a* and 31*b* may be moved forward or backward, or one of them may be moved forward and another may be moved backward.

Figure 8A:
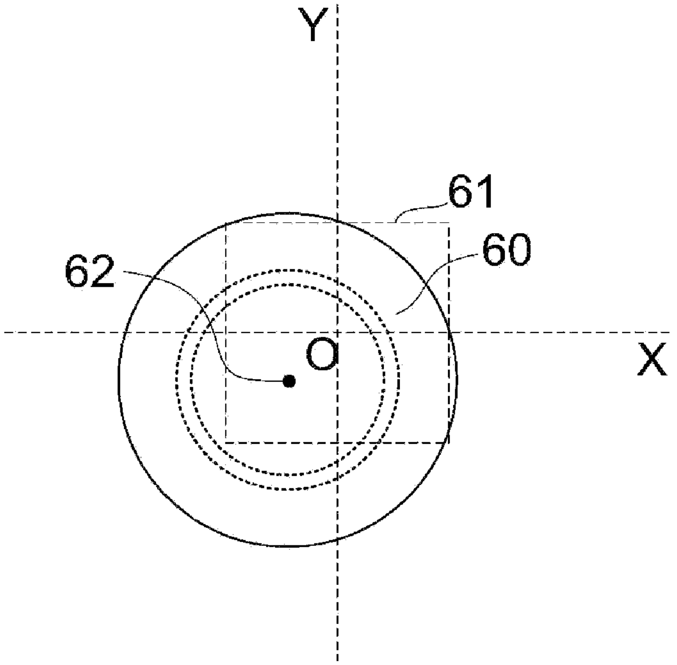
FIG. 8A is a drawing schematically illustrating an image on the incident surface of a rod integrator before position adjustment.

FIG. 8A corresponds, for example, to the initial state (before adjustment by the adjustment mechanism). In FIG. 8A, a center 62 of the image is shifted from a center O (the origin of the X-Y coordinate system) of a reference area 61 (the dashed rectangular area). In addition, it can be seen that the light from each LED element 3 is not focused on nearly the same spot because the image 60 has a circular shape and is blurred. This situation suggests that misalignment occurs between the LED elements 3 and the first optical system 8.

Figure 8B:
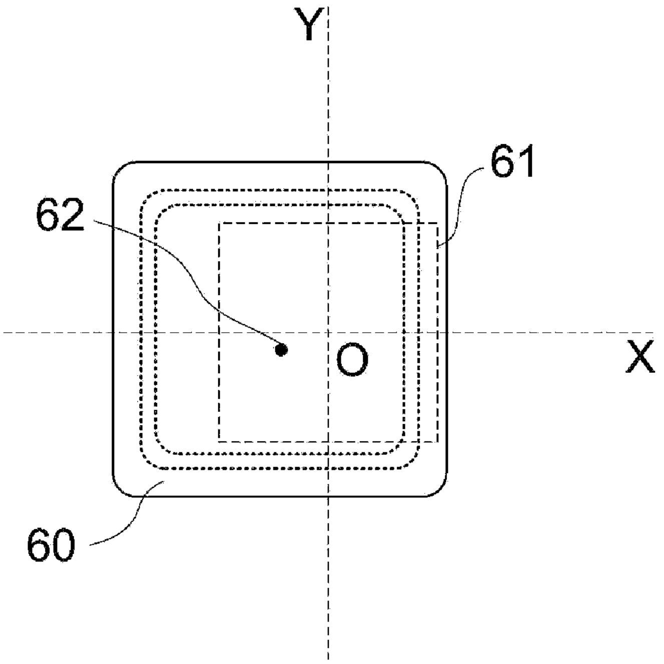
FIG. 8B is a drawing schematically illustrating an image on the incident surface of a rod integrator after a first-stage adjustment.

FIG. 8B is the result of measurement after the first lens holder 10, to which the plurality of LED elements 3 was fixed, was subjected to a rotational movement of 1 degree with respect to the second lens holder 20, by operating the adjustment mechanism 31 from the state of FIG. 8A. The image 60 shown in FIG. 8B has a shape corresponding to the shape of the light source formed by the LED elements 3, and it can be seen that the image is clearly projected compared to that in FIG. 8A. This means that the center of the LED element 3 and the optical axis of the corresponding first optical system 8 are closer to each other than that in FIG. 8A.

Figure 8C:
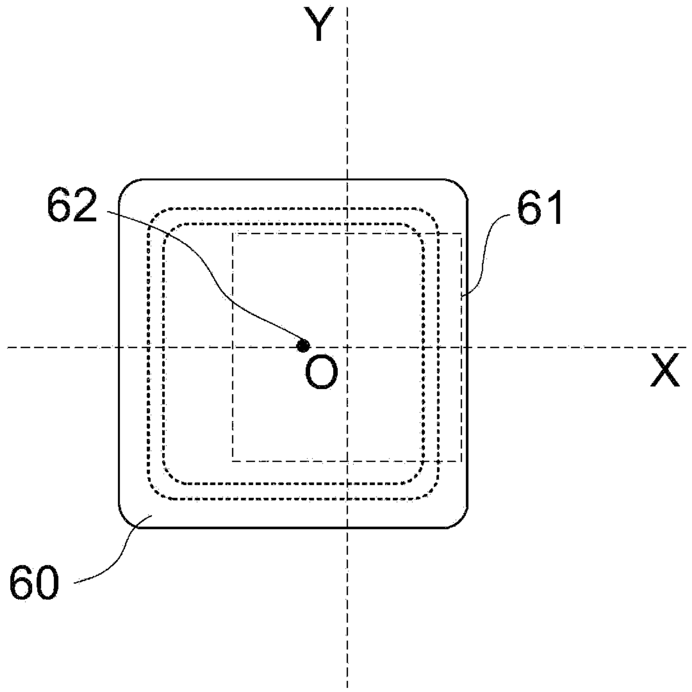
FIG. 8C is a drawing schematically illustrating an image on the incident surface of a rod integrator after a second-stage adjustment.
Figure 8D:
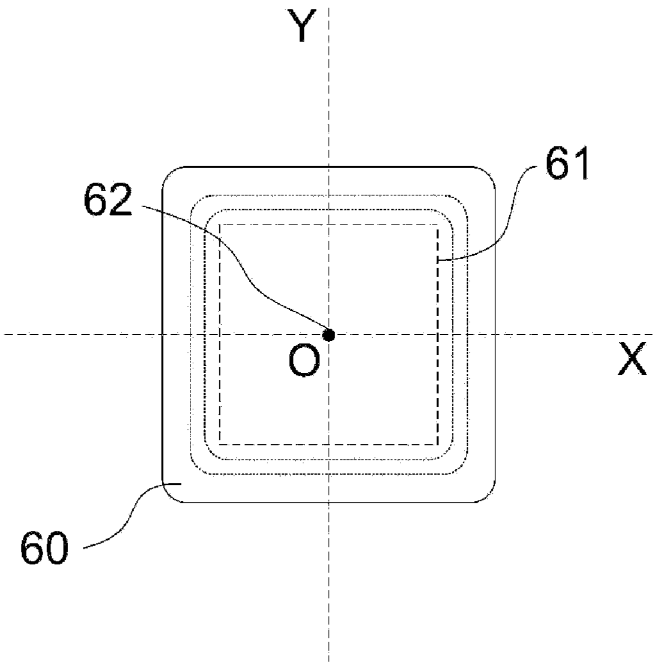
FIG. 8D is a drawing schematically illustrating an image on the incident surface of a rod integrator after a third-stage adjustment.

FIG. 8C is the result of measurement after the first lens holder 10 was moved with 0.2 mm in the X direction with respect to the second lens holder 20 by further operating the adjustment mechanism 31 from the state in FIG. 8B. FIG. 8D is the result of measurement after the first lens holder 10 was moved with 0.2 mm in the Y direction with respect to the second lens holder 20 by further operating the adjustment mechanism 31 from the state in FIG. 8C. In the state in FIG. 8C, the position of the center 62 of the image 60 is closer to the center O of the reference area 61, compared to the state in FIG. 8B. In the state in FIG. 8D, it is confirmed that the center 62 of the image 60 is further closer to the center O of the reference area 61.

Accordingly, operating the adjustment mechanism 31 enables the light emitted from the plurality of LED elements 3 to be focused substantially to a single point, and the condensing position to be adjusted. In particular, moving the condensing position on the light incident surface of the integrator optical system 50 enables light with high illuminance to be guided to the light emission surface of the integrator optical system 50.

As described above, the substrate 5 on which the plurality of LED elements 3 is mounted is fixed to the first lens holder 10 accommodating the first collimating optical system 11. The second lens holder 20 accommodating the second collimating optical system 21 is located in the +Z side from the first lens holder 10, that is, in the side farther away from the plurality of LED elements 3. Then, the operation of the adjustment mechanism 31 adjusts the relative optical positional relation between the second lens holder 20 and the first lens holder 10. In other words, the light source device 1 of the present embodiment enables the adjustment of optical positional relation of the plurality of LED elements 3 and the first optical system 8, while maintaining the relative optical positional relation between the plurality of LED elements 3 and the first lens holder 10 accommodating the first collimating optical system 11, which is disposed close to the plurality of LED elements 3. This suppresses the damage to the light-emitting surface and wiring of the LED elements 3 during the position adjustment.

Figure 9:
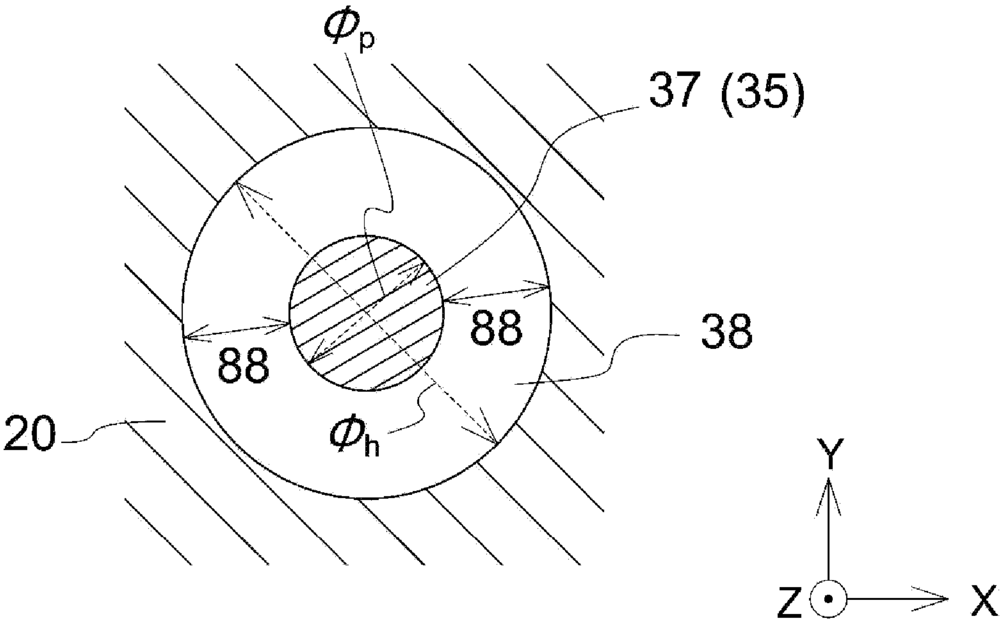
FIG. 9 is a drawing schematically illustrating a state in which the shaft section of the fixing member is located in a through-hole.

FIG. 9 is a drawing schematically illustrating a state in which the shaft section 37 of the fixing member 35 is located in the through-hole 38. As mentioned above, the outer diameter $\phi_p$ of the shaft section 37 is shorter than the inner diameter $\phi_h$ of the through-hole 38. Hence, when the fixing member 35 is inserted into the through-hole 38, there exists a margin area 88 where the fixing member 35 is not located in the through-hole 38. Thus, in the X-Y plane, the fixing member 35 can move by a length corresponding to the width of the margin area 88. In other words, the width of the margin area 88 determines the maximum adjustable amount of relative position between the first lens holder 10 and the second lens holder 20 in the X-Y plane.

Figure 10:
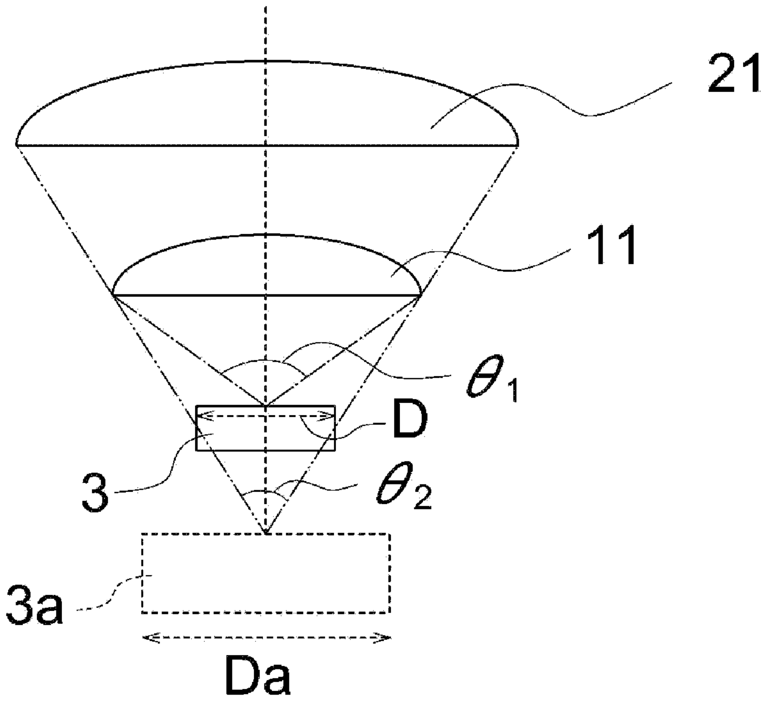
FIG. 10 is a schematic drawing illustrating the preferred design criteria for a margin area 88 shown in FIG. 9.

FIG. 10 is a schematic drawing illustrating the preferred design criteria for the margin area 88 shown in FIG. 9. In FIG. 10, the maximum diameter on the light-emitting surface of the LED element 3 is denoted as D, the maximum light-acceptance angle of each optical component provided in the first collimating optical system 11 as $\theta_1$, and the maximum light-acceptance angle of each optical component provided in the second collimating optical system 21 as $\theta_2$.

In the optical system shown in FIG. 10, the light emitted from the second collimating optical system 21 is equivalent to the light emitted from an optically virtual LED element 3*a*. Here, $Da=D\times(\theta_2/\theta_1)$ is derived from the geometrical relation, where Da denotes the maximum diameter of the virtual LED element 3*a* on the light-emitting surface.

Conversely, the movement of the second collimating optical system 21 by a certain distance d with respect to the LED elements 3 in the direction on the X-Y plane is optically equivalent to the movement of the LED elements 3 by $d\times(\theta_2/\theta_1)$.

By designing the inner diameter $\phi_h$ of the through-hole 38 and the outer diameter $\phi_p$ of the shaft section 37 to satisfy $0.1\times D\times(\theta_2/\theta_1)\leq(\phi_h-\phi_p)/2$, then, this enables the maximum adjustable amount of position relation between the LED elements 3 and the first optical system 8 to be 10% or more of the maximum diameter of the light-emitting surface of the LED elements 3 in the direction in the X-Y plane.

OTHER EMBODIMENTS

Hereinafter, other embodiments will be described.

(1) The installation of the adjustment mechanism 31 and the fixing member 35 shown in FIG. 2 is merely one example. FIGS. 11A to 11E are each a drawing illustrating another configuration of the light source device 1 similarly illustrated with that in FIG. 2.

Figure 11A:
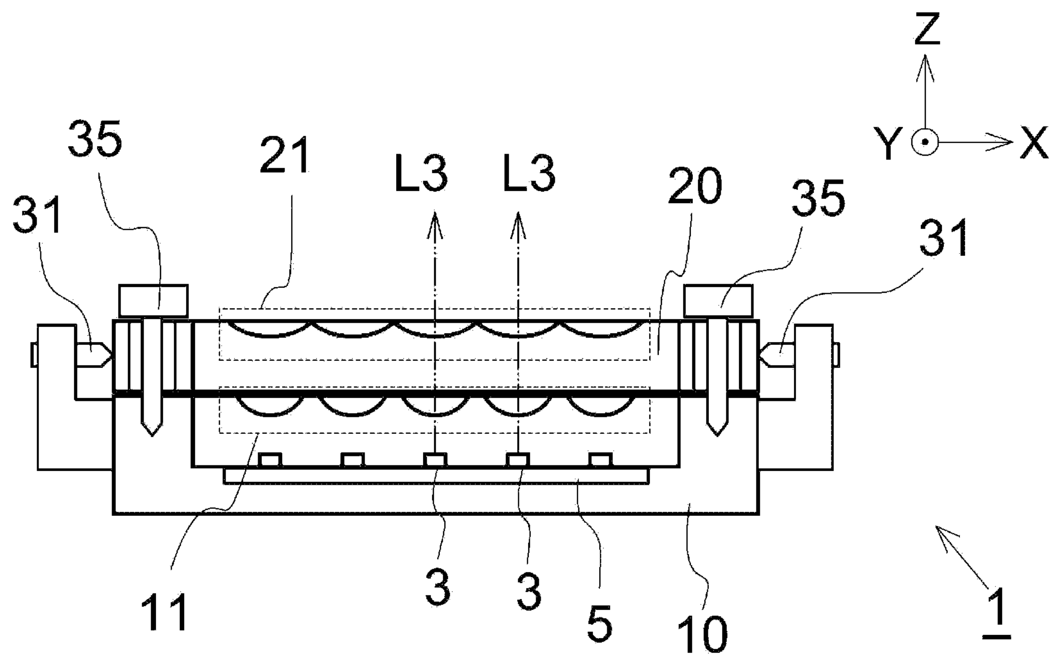
FIG. 11A is a cross-sectional view illustrating another example of the arrangement of the plurality of LED elements, the first collimating optical system, and the second collimating optical system.
Figure 11B:
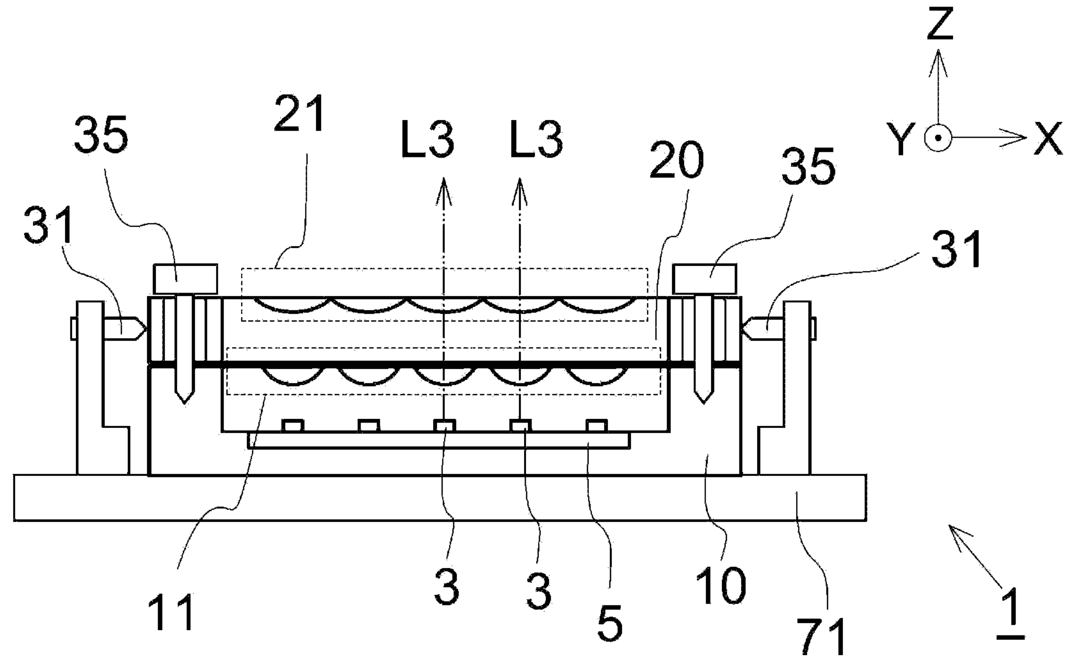
FIG. 11B is a cross-sectional view illustrating yet another example of the arrangement of the plurality of LED elements, the first collimating optical system, and the second collimating optical system.

In the light source device 1 shown in FIGS. 11A and 11B, the adjustment mechanism 31 is located at a different position compared to that in the light source device 1 shown in FIG. 2. Under this structure, operating the adjustment mechanism 31 allows the position adjustment of the second lens holder 20 in the direction on the X-Y plane with respect to the first lens holder 10. As shown in FIG. 11B, the adjustment mechanism 31 may be fixed to a supporter 71 provided separately from the first lens holder 10. This supporter 71 is a base that supports the first lens holder 10 and the adjustment mechanism 31.

Figure 11C:
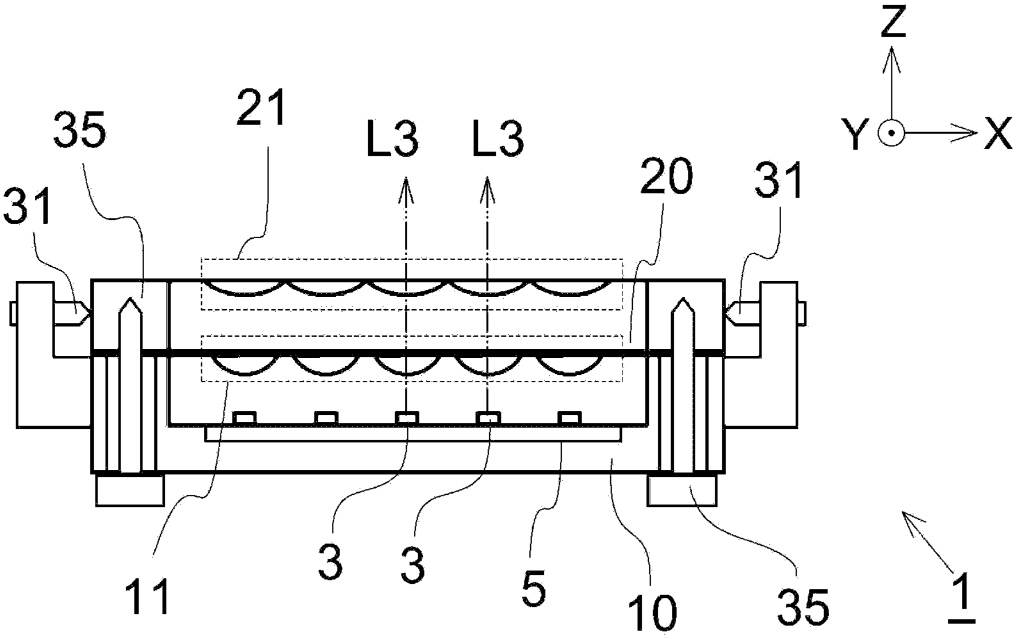
FIG. 11C is a cross-sectional view illustrating yet another example of the arrangement of the plurality of LED elements, the first collimating optical system, and the second collimating optical system.

In the light source device 1 shown in FIG. 11C, the fixing member 35 has a different insertion direction compared to that in the light source device 1 shown in FIG. 2. As shown in FIG. 11C, the fixing member 35 may be inserted from the side of the first lens holder 10 toward the second lens holder 20. In this configuration, which is unlike that in FIG. 4, the through-hole 38 is provided in the first lens holder 10 and the groove 39 is provided in the second lens holder 20 (see FIG. 4 for the through-hole 38 and groove 39).

Figure 11D:
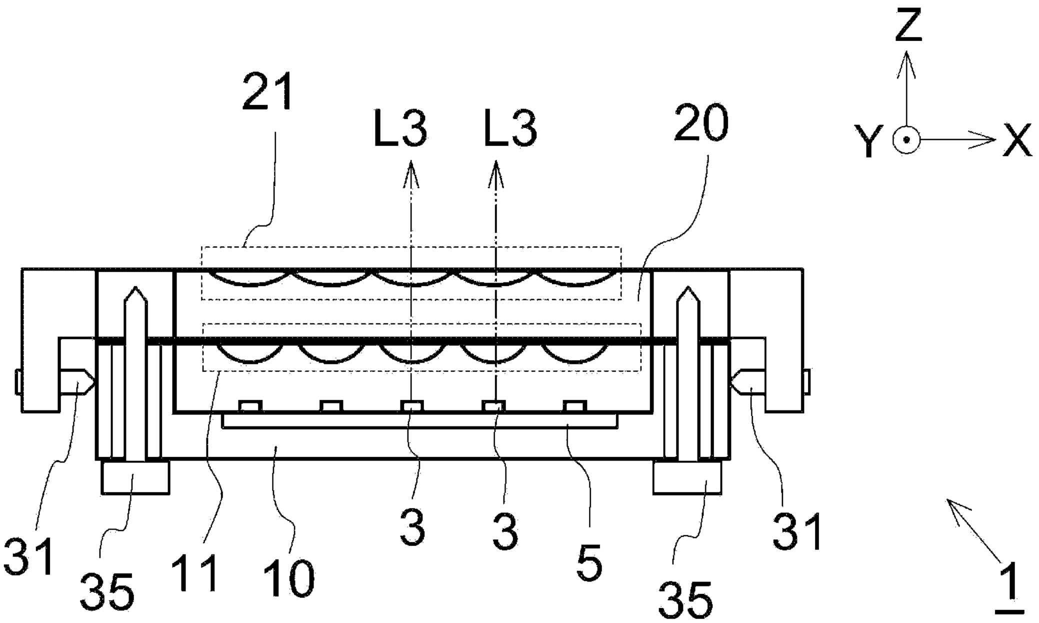
FIG. 11D is a cross-sectional view illustrating yet another example of the arrangement of the plurality of LED elements, the first collimating optical system, and the second collimating optical system.
Figure 11E:
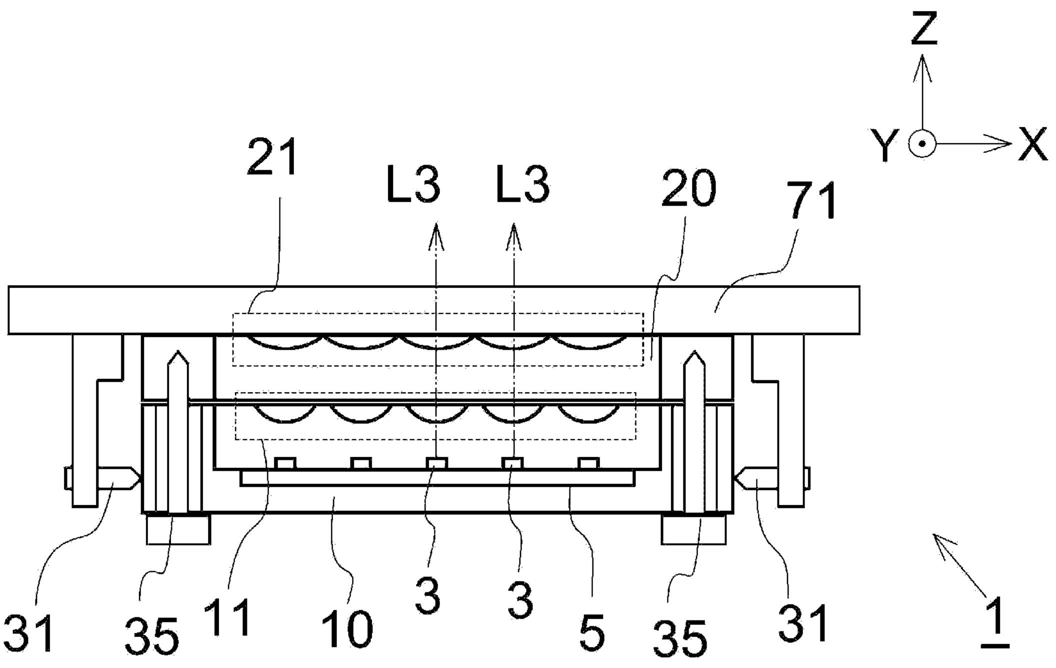
FIG. 11E is a cross-sectional view illustrating yet another example of the arrangement of the plurality of LED elements, the first collimating optical system, and the second collimating optical system.

In the light source device 1 shown in FIGS. 11D and 11E, the adjustment mechanism 31 is located at a different position compared to that in the light source device 1 shown in FIG. 11C. Under this structure, operating the adjustment mechanism 31 allows the position adjustment of the second lens holder 20 in the direction on the X-Y plane with respect to the first lens holder 10. As shown in FIG. 11E, the adjustment mechanism 31 may be fixed to the support 71 provided separately from the second lens holder 20. This supporter 71 is a base that supports the second lens holder 20.

Figure 12:
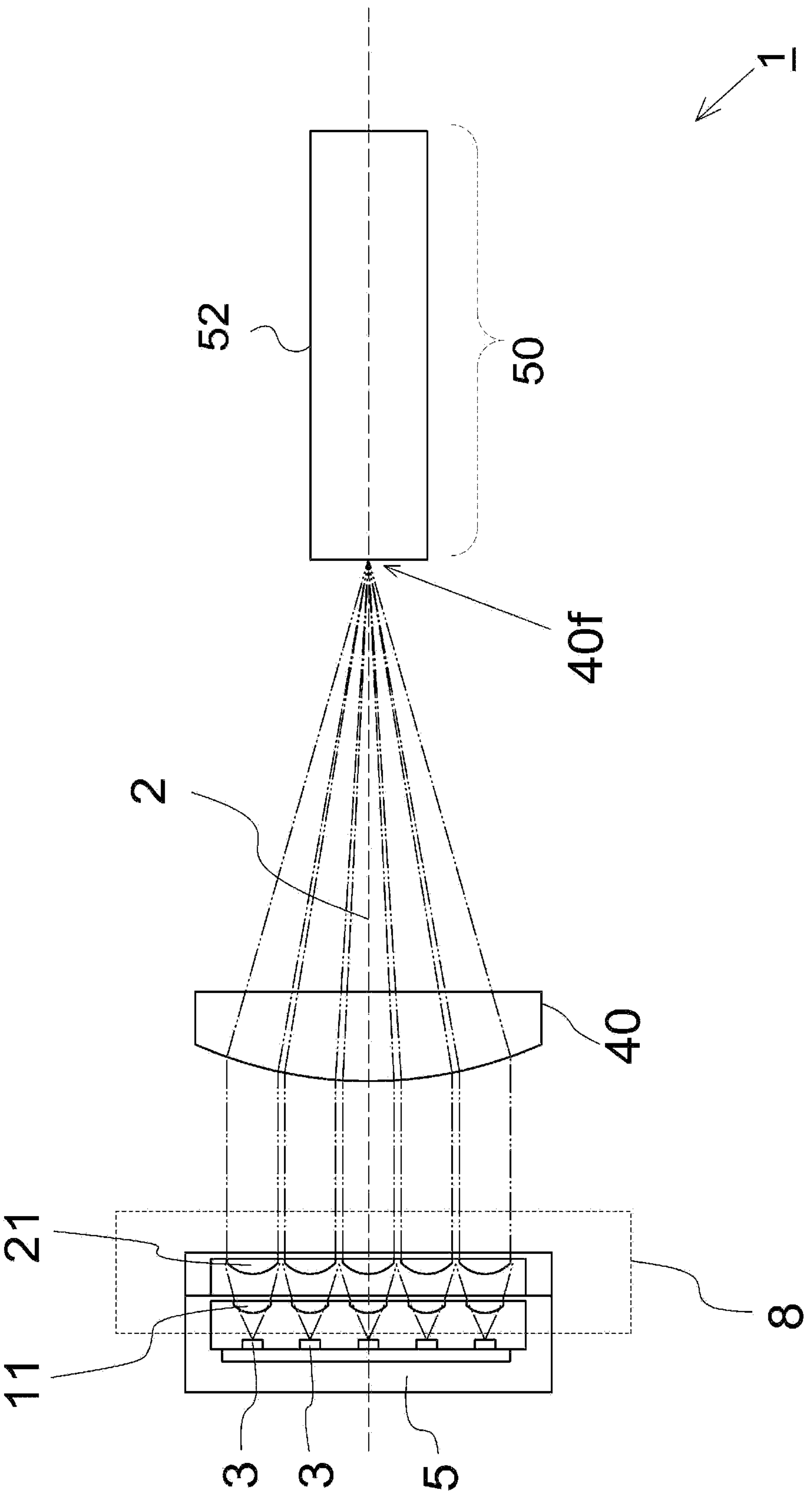
FIG. 12 is a drawing schematically illustrating a configuration of another embodiment of the light source device.

(2) As shown in FIG. 12, a rod integrator 52 can be employed as the integrator optical system 50.

(3) The light focused by the second optical system 40 may be incident on an optical system other than the integrator optical system 50. In other words, the light source device 1 without the integrator optical system 50 is also included in the scope of the present invention.

(4) In the above-mentioned embodiments, the relative positional relation between the first lens holder 10 and the second lens holder 20 is described as being adjustable with respect to the X direction, the Y direction, and the rotation direction in the X-Y plane. However, it may be configured to be adjustable with respect to at least one of these directions. In addition to the direction in the X-Y plane, it may also be adjustable in a direction that intersects the X-Y plane (e.g., the Z direction).

(5) In the above-mentioned embodiments, the light source device 1 may additionally include an optical system, such as a reflective optical system, for the purpose of changing the light path.

At least one of the first collimating optical system 11 and the second collimating optical system 21 may include a plurality of lenses arranged in the direction of the optical axis 2.

What is claimed is:

1. A light source device comprising:

a plurality of LED elements that are dispersed and arranged in a plane direction orthogonal to an optical axis;

a first optical system that converts light emitted from each of the plurality of LED elements into collimated light; and a second optical system that focuses the collimated light emitted from the first optical system at a latter stage of the first optical system, wherein the first optical system includes a first collimating optical system including a first set of collimating lenses disposed corresponding to the plurality of LED elements and a second collimating optical system including a second set of collimating lenses disposed corresponding to the plurality of LED elements at a latter stage of the first collimating optical system, and an adjustment mechanism located outside of the first optical system for adjusting a relative optical positional relation of the second collimating optical system with respect to the plurality of LED elements and the first collimating optical system when viewed in a direction of the optical axis in a state in which the plurality of LED elements and the first collimating optical system are fixed.

2. The light source device according to claim 1, further comprising:

a substrate on which the plurality of LED elements are mounted;

a first lens holder that accommodates the first collimating optical system and is connected to the substrate in a fixed manner; and a second lens holder that accommodates the second collimating optical system and is capable of adjusting a relative position with respect to the first lens holder.

3. The light source device according to claim 2, further comprising the adjustment mechanism attached to the first lens holder to allow the first lens holder and the substrate to integrally move in a plane direction orthogonal to the direction of the optical axis in a state in which a position of the second lens holder is fixed.

4. The light source device according to claim 2, further comprising the adjustment mechanism attached to the second lens holder to allow the second lens holder to move in a plane direction orthogonal to the direction of the optical axis in a state in which positions of the first lens holder and the substrate are fixed.

5. The light source device according to claim 3, further comprising:

a through-hole penetrating the second lens holder at a predetermined location of the second lens holder in a direction parallel to the optical axis;

a groove having an inner diameter shorter than an inner diameter of the through-hole and being carved from a face of the first lens holder in a side of the second lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the adjustment mechanism is configured to allow the first lens holder and the substrate to be movable by a distance within a margin defined by a difference between the inner diameter of the through-hole and the outer diameter of the shaft section of the fixing member in the plane direction orthogonal to the direction of the optical axis in a state in which the head of the fixing member is in non-contact with a face of the second lens holder.

6. The light source device according to claim 3, further comprising:

a through-hole penetrating the first lens holder at a predetermined location of the first lens holder in a direction parallel to the optical axis;

a groove having an inner diameter shorter than an inner diameter of the through-hole and being carved from a face of the second lens holder in a side of the first lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the adjustment mechanism is configured to allow the first lens holder and the substrate to be movable by a distance within a margin defined by a difference between the inner diameter of the through-hole and the outer diameter of the shaft section of the fixing member in the plane direction orthogonal to the direction of the optical axis in a state in which the head of the fixing member is in non-contact with a face of the first lens holder.

7. The light source device according to claim 4, further comprising:

a through-hole penetrating the second lens holder at a predetermined location of the second lens holder in a direction parallel to the optical axis;

a groove having an inner diameter shorter than an inner diameter of the through-hole and being carved from a face of the first lens holder in a side of the second lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the adjustment mechanism is configured to allow the second lens holder to be movable by a distance within a margin defined by a difference between the inner diameter of the through-hole and the outer diameter of the shaft section of the fixing member in a plane direction orthogonal to the direction of the optical axis in a state in which the head of the fixing member is in non-contact with a face of the second lens holder.

8. The light source device according to claim 4, further comprising:

a through-hole penetrating the first lens holder at a predetermined location of the first lens holder in a direction parallel to the optical axis;

a groove having an inner diameter shorter than an inner diameter of the through-hole and being carved from a face of the second lens holder in a side of the first lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the adjustment mechanism is configured to allow the second lens holder to be movable by a distance within a margin defined by a difference between the inner diameter of the through-hole and the outer diameter of the shaft section of the fixing member in a plane direction orthogonal to the direction of the optical axis in a state in which the head of the fixing member is in non-contact with a face of the first lens holder.

9. The light source device according to claim 5, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

10. The light source device according to claim 6, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

11. The light source device according to claim 7, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

12. The light source device according to claim 8, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

13. A light source device comprising:

a plurality of LED elements that are dispersed and arranged in a plane direction orthogonal to an optical axis;

a first optical system that converts light emitted from each of the plurality of LED elements into collimated light;

a second optical system that focuses the collimated light emitted from the first optical system at a latter stage of the first optical system;

a substrate on which the plurality of LED elements are mounted;

a first lens holder that accommodates the first collimating optical system and is connected to the substrate in a fixed manner;

a second lens holder that accommodates the second collimating optical system and is capable of adjusting a relative position with respect to the first lens holder;

a through-hole penetrating the second lens holder at a predetermined location of the second lens holder in a direction parallel to the optical axis;

a groove having an inner diameter shorter than an inner diameter of the through-hole and being carved from a face of the first lens holder in a side of the second lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the first optical system includes a first collimating optical system including optical components disposed corresponding to the plurality of LED elements and a second collimating optical system including optical components disposed corresponding to the plurality of LED elements at a latter stage of the first collimating optical system, the second collimating optical system is capable of adjusting a relative optical positional relation with respect to the plurality of LED elements and the first collimating optical system when viewed in a direction of the optical axis in a state in which the plurality of LED elements and the first collimating optical system are fixed, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

14. The light source device according to claim 13, further comprising an adjustment mechanism attached to the first lens holder to allow the first lens holder and the substrate to integrally move in a plane direction orthogonal to the direction of the optical axis in a state in which a position of the second lens holder is fixed.

15. The light source device according to claim 13, further comprising an adjustment mechanism attached to the second lens holder to allow the second lens holder to move in a plane direction orthogonal to the direction of the optical axis in a state in which positions of the first lens holder and the substrate are fixed.

16. A light source device comprising:

a plurality of LED elements that are dispersed and arranged in a plane direction orthogonal to an optical axis;

a first optical system that converts light emitted from each of the plurality of LED elements into collimated light;

a second optical system that focuses the collimated light emitted from the first optical system at a latter stage of the first optical system;

a substrate on which the plurality of LED elements are mounted;

a first lens holder that accommodates the first collimating optical system and is connected to the substrate in a fixed manner;

a second lens holder that accommodates the second collimating optical system and is capable of adjusting a relative position with respect to the first lens holder;

a through-hole penetrating the first lens holder at a predetermined location of the first lens holder in a direction parallel to the optical axis;

a groove having an inner diameter shorter than an inner diameter of the through-hole and being carved from a face of the first lens holder in a side of the first lens holder for a predetermined length in the direction parallel to the optical axis; and a fixing member including a shaft section having an outer diameter shorter than the inner diameter of the through-hole and being insertable into the groove, and a head having an outer diameter longer than the inner diameter of the through-hole and being connected to the shaft section, wherein the first optical system includes a first collimating optical system including optical components disposed corresponding to the plurality of LED elements and a second collimating optical system including optical components disposed corresponding to the plurality of LED elements at a latter stage of the first collimating optical system, the second collimating optical system is capable of adjusting a relative optical positional relation with respect to the plurality of LED elements and the first collimating optical system when viewed in a direction of the optical axis in a state in which the plurality of LED elements and the first collimating optical system are fixed, wherein the light source device satisfies the following formula:

$$0.1\times D\times(\theta_2/\theta_1)\leq(\phi_h-\phi_p)/2\leq D\times(\theta_2/\theta_1)$$

where D is a maximum diameter of a light-emitting surface of the LED element, $\theta_1$ is a maximum light-acceptance angle of each optical component provided in the first collimating optical system, $\theta_2$ is a maximum light-acceptance angle of each optical component provided in the second collimating optical system, and $\phi_h$ is the inner diameter of the through-hole, and $\phi_p$ is the outer diameter of the shaft section of the fixing member.

17. The light source device according to claim 16, further comprising an adjustment mechanism attached to the first lens holder to allow the first lens holder and the substrate to integrally move in a plane direction orthogonal to the direction of the optical axis in a state in which a position of the second lens holder is fixed.

18. The light source device according to claim 16, further comprising an adjustment mechanism attached to the second lens holder to allow the second lens holder to move in a plane direction orthogonal to the direction of the optical axis in a state in which positions of the first lens holder and the substrate are fixed.

* * * * *